United States Patent
Lin et al.

(10) Patent No.: US 10,897,337 B2
(45) Date of Patent: Jan. 19, 2021

(54) DATA TRANSMISSION METHOD AND DEVICE

(71) Applicant: CHINA ACADEMY OF TELECOMMUNICATIONS TECHNOLOGY, Beijing (CN)

(72) Inventors: Xiangli Lin, Beijing (CN); Ekpenyong Tony, Beijing (CN); Xuejuan Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/638,362

(22) PCT Filed: Jun. 28, 2018

(86) PCT No.: PCT/CN2018/093405
§ 371 (c)(1),
(2) Date: Feb. 11, 2020

(87) PCT Pub. No.: WO2019/029293
PCT Pub. Date: Feb. 14, 2019

(65) Prior Publication Data
US 2020/0374070 A1 Nov. 26, 2020

(30) Foreign Application Priority Data
Aug. 11, 2017 (CN) .......................... 2017 1 0687844

(51) Int. Cl.
*H04W 4/00* (2018.01)
*H04L 5/00* (2006.01)
(Continued)

(52) U.S. Cl.
CPC .......... *H04L 5/0048* (2013.01); *H04L 1/0068* (2013.01); *H04L 5/0053* (2013.01);
(Continued)

(58) Field of Classification Search
None
See application file for complete search history.

(56) References Cited

U.S. PATENT DOCUMENTS

2015/0333898 A1 11/2015 Ji et al.
2016/0099824 A1* 4/2016 Lorca Hernando ... H04L 1/0048
370/330
(Continued)

FOREIGN PATENT DOCUMENTS

CN 1642056 A 7/2005
CN 102668628 A 9/2012
(Continued)

OTHER PUBLICATIONS

Qualcomm Incorporated: "UL Channel Design for Shortened TTI", 3GPP TSG RAN WG1 #85, R1-164459, May 23-27, 2016, Nanjing, China.
(Continued)

*Primary Examiner* — Gerald A Smarth
(74) *Attorney, Agent, or Firm* — Kilpatrick Townsend & Stockton, LLP

(57) ABSTRACT

Disclosed in the present application are a data transmission method and device. The method comprises: a base station sends a signaling notification to a terminal, so that the terminal determines, according to the signaling notification, whether a pilot signal of data transmitted using a second transmission time interval exists within a first transmission time interval, wherein the first transmission time interval is shorter than the second transmission time interval, or the priority of a service carried by the first transmission time interval is higher than the priority of a service carried by the second transmission time interval, there is a resource overlap between the first transmission time interval and the second transmission time interval, and the terminal using the first transmission time interval for data transmission knows a
(Continued)

The terminal receives a signaling notification from a base station, and determines whether there is a pilot signal of the data transmitted using a second TTI within a first TTI according to the signaling notification, where the first TTI is shorter than the second TTI, or the priority of the service carried by the first TTI is higher than the priority of the service carried by the second TTI, the first TTI and the second TTI have overlapping resources, and the terminal using the first TTI for data transmission knows the pilot signal position of the data transmitted using the second TTI — 301

The terminal performs the data transmission according to the determination of the pilot signal — 302 pilot signal location of the data transmitted using the second transmission time interval; and the base station performing transmission according to a pilot signal resource location of the second transmission time interval. The present application can ensure that a receiving end for other service transmissions can use a pilot signal for data demodulation, thereby avoiding the waste of resources caused by the destruction of the pilot signal.

20 Claims, 4 Drawing Sheets

(51) Int. Cl.
*H04W 72/12* (2009.01)
*H04W 72/04* (2009.01)
*H04L 1/00* (2006.01)

(52) U.S. Cl.
CPC .......... *H04L 5/0082* (2013.01); *H04L 5/0091* (2013.01); *H04W 72/0446* (2013.01); *H04W 72/1263* (2013.01)

(56) References Cited

U.S. PATENT DOCUMENTS

| | | | |
|---|---|---|---|
| 2017/0181182 A1* | 6/2017 | Patel | H04W 72/1268 |
| 2017/0223695 A1 | 8/2017 | Kwak et al. | |
| 2017/0332401 A1* | 11/2017 | Sun | H04W 72/0446 |
| 2018/0199322 A1* | 7/2018 | Takeda | H04L 5/0053 |
| 2019/0037562 A1 | 1/2019 | Park et al. | |
| 2020/0052841 A1* | 2/2020 | Takeda | H04L 5/0048 |

FOREIGN PATENT DOCUMENTS

| | | |
|---|---|---|
| CN | 106465318 A | 2/2017 |
| CN | 106998247 A | 8/2017 |
| CN | 107006027 A | 8/2017 |
| WO | 1017135773 A1 | 8/2017 |
| WO | 2018204635 A2 | 11/2018 |

OTHER PUBLICATIONS

Qualcomm Incorporated: "UL Design for Shortened TTI", 3GPP TSG RAN WG1 #86b, R1-1610008, Oct. 10-14, 2016, Lisbon, Portugal.

* cited by examiner

DATA TRANSMISSION METHOD AND DEVICE

The present application is a US National Stage of International Application No. PCT/CN/2018/093405, filed on Jun. 28, 2018, which claims the priority from Chinese Patent Application No. 201710687844.1, filed with the Chinese Patent Office on Aug. 11, 2017 and entitled "Data Transmission Method and Device", which is hereby incorporated by reference in its entirety.

FIELD

The present application relates to the field of wireless communication technologies and particularly to a data transmission method and device.

BACKGROUND

In the 5G communication system, the services with the Transmission Time Intervals (TTIs) of different lengths are allowed to be transmitted simultaneously. When the resources with the TTIs of different lengths overlap, the resource overlapping position of the longer TTI transmission or lower-priority TTI transmission will be punctured, and the punctured resource position is provided to the shorter TTI or higher-priority TTI for data transmission. FIG. 1 is a resource schematic diagram where the resource overlapping part is punctured. As shown in FIG. 1, the partial resources of the TTI transmission of 14 Orthogonal Frequency Division Multiplex (OFDM) symbol length are punctured and provided to the TTI of 2 OFDM symbol length for transmission.

The disadvantage of the prior art is that, in the existing solution, if there is a pilot signal at the punctured resource position in a certain longer TTI transmission, the pilot signal is also punctured, so that no pilot signal is actually transmitted at this position, or the structure of the pilot signal is damaged. The receiver cannot receive the correct and complete pilot signal, so that the received data cannot be demodulated and decoded, and all the data within the entire TTI length will be discarded, causing the serious waste of resources.

SUMMARY

The present application provides a data transmission method and device, so as to solve the problem that the received data cannot be demodulated and decoded due to the perforation of the pilot signal in the case where the resources of two different service transmissions overlap.

An embodiment of the present application provides a data transmission method, which includes:

receiving, by a terminal, a signaling notification from a base station, and determining whether there is a pilot signal of data transmitted using a second TTI within a first TTI according to the signaling notification, where the first TTI is shorter than the second TTI, or priority of service carried by the first TTI is higher than priority of service carried by the second TTI, the first TTI and the second TTI have overlapping resources, and the terminal using the first TTI for data transmission knows a pilot signal position of the data transmitted using the second TTI; and performing, by the terminal, data transmission according to the determination of the pilot signal.

In an implementation, the terminal determines whether to puncture data of the first TTI within the first TTI according to the signaling notification.

In an implementation, performing, by the terminal, data transmission according to the determination of the pilot signal, includes:

performing, by the terminal, a puncturing operation according to a pilot signal position of data transmitted in the second TTI when sending the data, if it is determined that the first TTI resource is punctured; and performing the corresponding receiving process according to a punctured resource position when receiving the data.

In an implementation, the terminal determines whether there is a second TTI pilot signal in data resources of the first TTI according to the signaling notification.

In an implementation, performing, by the terminal, data transmission according to the determination of the pilot signal, includes:

determining, by the terminal, that resource mapping is performed on transmission data of the first TTI in resources except the pilot signal position of the second TTI and this part of pilot signal position resource is not considered for rate matching during encoding or decoding, if there is the second TTI pilot signal in the data resources of the first TTI.

In an implementation, the terminal determines whether there is a second TTI pilot signal in data resources of the first TTI according to the signaling notification, and determines whether to perform a puncturing operation or rate matching operation.

In an implementation, performing, by the terminal, data transmission according to the determination of the pilot signal, includes:

performing, by the terminal, the puncturing operation according to a resource position of the second pilot signal when sending the data, if there is the second pilot signal and the puncturing operation is performed; and performing the corresponding receiving process according to the punctured resource position when receiving the data; or determining, by the terminal, that resource mapping is performed on transmission data of the first TTI in resources except the pilot signal position of the second TTI and this part of pilot signal position resource is not considered for rate matching during encoding or decoding, if there is the second pilot signal and the rate matching operation is performed.

In an implementation, the terminal determines, according to the signaling notification, whether to perform a puncturing operation according to the pilot signal position of the second TTI or perform a rate matching operation according to the pilot signal position of the second TTI.

In an implementation, performing, by the terminal, data transmission according to the determination of the pilot signal, includes:

performing, by the terminal, the puncturing operation on the first TTI if there is the pilot signal position of the second TTI in resources of the first TTI, if the puncturing operation is performed; or determining, by the terminal, whether there is a pilot signal of the second TTI in the resources of the first TTI according to the pilot signal position of the second TTI if the rate matching operation is performed, and if so, determining that resource mapping is performed on transmission data of the first TTI in resources except the pilot signal position of the second TTI and this part of pilot signal position resource is not considered for rate matching during encoding or decoding; if not, performing, by the terminal, rate matching and resource mapping in original resources of the first TTI.

An embodiment of the present application provides a data transmission method, which includes:

sending, by a base station, a signaling notification to a terminal so that the terminal determines whether there is a pilot signal of data transmitted using a second TTI within a first TTI according to the signaling notification, where the first TTI is shorter than the second TTI, or priority of service carried by the first TTI is higher than priority of service carried by the second TTI, the first TTI and the second TTI have overlapping resources, and the terminal using the first TTI for data transmission knows a pilot signal position of the data transmitted using the second TTI; and performing, by the base station, data transmission according to the pilot signal.

In an implementation, the sending, by the base station, the signaling notification to the terminal, includes:

determining, by the base station, that data resources of the first TTI are punctured and the punctured resources are provided to the pilot signal of the second TTI for transmission when a resource overlapping part has the pilot signal of the second TTI and there is no overlap between the pilot signal of the first TTI and the pilot signal of the second TTI; or determining, by the base station, that resources of the first TTI are not punctured when a resource overlapping part has the pilot signal of the second TTI and there is an overlap between the pilot signal of the first TTI and the pilot signal of the second TTI; and sending, by the base station, the signaling notification of whether to puncture the data of the first TTI on the pilot signal position of the second TTI within the first TTI resources to the terminal.

In an implementation, the sending, by the base station, the signaling notification to the terminal, includes:

performing, by the base station, rate matching and resource mapping on the data of the first TTI in resources except the pilot signal position when a resource overlapping part has the pilot signal of the second TTI and there is no overlap between the pilot signal of the first TTI and the pilot signal of the second TTI; or performing, by the base station, rate matching and resource mapping on the data according to originally occupied resources of the first TTI when a resource overlapping part has the pilot signal of the second TTI and there is an overlap between the pilot signal of the first TTI and the pilot signal of the second TTI.

In an implementation, when the base station performs the rate matching and resource mapping on the data of the first TTI in resources except the pilot signal position, the method further includes:

notifying, by the base station, the terminal of whether the resource mapping is performed on the data of the first TTI in resources except the pilot signal position of the second TTI.

In an implementation, the sending, by the base station, the signaling notification to the terminal, includes:

determining, by the base station, that data resources of the first TTI are punctured and the punctured resources are provided to the pilot signal of the second TTI for transmission, or determining, by the base station, that rate matching is performed on the data of the first TTI in resources except the pilot signal position when a resource overlapping part has the pilot signal of the second TTI and there is no overlap between the pilot signal of the first TTI and the pilot signal of the second TTI; or determining, by the base station, that resources of the first TTI are not punctured, and performing rate matching and resource mapping on the data according to originally occupied resources of the first TTI when a resource overlapping part has the pilot signal of the second TTI and there is an overlap between the pilot signal of the first TTI and the pilot signal of the second TTI.

In an implementation, the method further includes:

notifying, by the base station, the terminal of whether the pilot signal exists and whether to perform a puncturing operation or rate matching operation; or notifying, by the base station, the terminal of whether to perform the puncturing operation according to the pilot signal position of the second TTI or perform the rate matching operation according to the pilot signal position of the second TTI.

An embodiment of the present application provides a data transmission device, which includes:

a receiving module configured to receive a signaling notification from a base station, and determine whether there is a pilot signal of data transmitted using a second TTI within a first TTI according to the signaling notification, where the first TTI is shorter than the second TTI, or priority of service carried by the first TTI is higher than priority of service carried by the second TTI, the first TTI and the second TTI have overlapping resources, and a terminal using the first TTI for data transmission knows a pilot signal position of the data transmitted using the second TTI; and a terminal transmission module configured to perform data transmission according to the determination of the pilot signal.

In an implementation, the terminal transmission module is further configured to determine whether to puncture data of the first TTI within the first TTI according to the signaling notification.

In an implementation, when performing the data transmission according to the determination of the pilot signal, the terminal transmission module is further configured to:

perform a puncturing operation according to a pilot signal position of data transmitted in the second TTI when sending the data, if it is determined that the first TTI resource is punctured; and perform the corresponding receiving process according to a punctured resource position when receiving the data.

In an implementation, the terminal transmission module is further configured to determine whether there is a second TTI pilot signal in data resources of the first TTI according to the signaling notification.

In an implementation, when performing the data transmission according to the determination of the pilot signal, the terminal transmission module is further configured to:

determine that resource mapping is performed on transmission data of the first TTI in resources except the pilot signal position of the second TTI and this part of pilot signal position resource is not considered for rate matching during encoding or decoding, if there is the second TTI pilot signal in the data resources of the first TTI.

In an implementation, the terminal transmission module is further configured to determine whether there is a second TTI pilot signal in data resources of the first TTI according to the signaling notification, and determine whether to perform a puncturing operation or rate matching operation.

In an implementation, when performing the data transmission according to the determination of the pilot signal, the terminal transmission module is further configured to:

perform the puncturing operation according to a resource position of the second pilot signal when sending the data, if there is the second pilot signal and the puncturing operation is performed; and perform the corresponding receiving process according to the punctured resource position when receiving the data; or determine that resource mapping is performed on transmission data of the first TTI in resources except the pilot signal position of the second TTI and this part of pilot signal position resource is not considered for rate matching during encoding or decoding, if there is the second pilot signal and the rate matching operation is performed.

In an implementation, the terminal transmission module is further configured to determine, according to the signaling notification, whether to perform a puncturing operation according to the pilot signal position of the second TTI or perform a rate matching operation according to the pilot signal position of the second TTI.

In an implementation, when performing the data transmission according to the determination of the pilot signal, the terminal transmission module is further configured to:

perform the puncturing operation on the first TTI if there is the pilot signal position of the second TTI in resources of the first TTI, if the puncturing operation is performed; or determine whether there is a pilot signal of the second TTI in the resources of the first TTI according to the pilot signal position of the second TTI if the rate matching operation is performed, and if so, determine that resource mapping is performed on transmission data of the first TTI in resources except the pilot signal position of the second TTI and this part of pilot signal position resource is not considered for rate matching during encoding or decoding; if not, perform rate matching and resource mapping in original resources of the first TTI.

An embodiment of the present application provides a data transmission device, which includes:

a sending module configured to send a signaling notification to a terminal so that the terminal determines whether there is a pilot signal of data transmitted using a second TTI within a first TTI according to the signaling notification, where the first TTI is shorter than the second TTI, or priority of service carried by the first TTI is higher than priority of service carried by the second TTI, the first TTI and the second TTI have overlapping resources, and the terminal using the first TTI for data transmission knows a pilot signal position of the data transmitted using the second TTI; and a base station transmission module configured to perform data transmission according to the pilot signal.

In an implementation, when sending the signaling notification to the terminal, the sending module is further configured to:

determine that data resources of the first TTI are punctured and the punctured resources are provided to the pilot signal of the second TTI for transmission when a resource overlapping part has the pilot signal of the second TTI and there is no overlap between the pilot signal of the first TTI and the pilot signal of the second TTI; or determine that resources of the first TTI are not punctured when a resource overlapping part has the pilot signal of the second TTI and there is an overlap between the pilot signal of the first TTI and the pilot signal of the second TTI; and send the signaling notification of whether to puncture the data of the first TTI on the pilot signal position of the second TTI within the first TTI resources to the terminal.

In an implementation, when sending the signaling notification to the terminal, the sending module is further configured to:

perform rate matching and resource mapping on the data of the first TTI in resources except the pilot signal position when a resource overlapping part has the pilot signal of the second TTI and there is no overlap between the pilot signal of the first TTI and the pilot signal of the second TTI; or perform rate matching and resource mapping on the data according to originally occupied resources of the first TTI when a resource overlapping part has the pilot signal of the second TTI and there is an overlap between the pilot signal of the first TTI and the pilot signal of the second TTI.

In an implementation, the sending module is further configured to notify the terminal of whether the resource mapping is performed on the data of the first TTI in resources except the pilot signal position of the second TTI when performing the rate matching and resource mapping on the data of the first TTI in resources except the pilot signal position.

In an implementation, when sending the signaling notification to the terminal, the sending module is further configured to:

determine that data resources of the first TTI are punctured and the punctured resources are provided to the pilot signal of the second TTI for transmission, or determine that rate matching is performed on the data of the first TTI in resources except the pilot signal position when a resource overlapping part has the pilot signal of the second TTI and there is no overlap between the pilot signal of the first TTI and the pilot signal of the second TTI; or determine that resources of the first TTI are not punctured, and perform rate matching and resource mapping on the data according to originally occupied resources of the first TTI when a resource overlapping part has the pilot signal of the second TTI and there is an overlap between the pilot signal of the first TTI and the pilot signal of the second TTI.

In an implementation, the sending module is further configured to: notify the terminal of whether the pilot signal exists and whether to perform a puncturing operation or rate matching operation; or notify the terminal of whether to perform the puncturing operation according to the pilot signal position of the second TTI or perform the rate matching operation according to the pilot signal position of the second TTI.

The present application has the following beneficial effects:

In the technical solution provided by the embodiments of the present application, for the case where the resources of two different service transmissions overlap, the base station sends the signaling notification to the terminal so that the terminal determines whether there is the pilot signal of the data transmitted using the second TTI in the first TTI according to the signaling notification, so the terminal can determine whether there are pilot signals transmitted by other services in the data transmission, thereby ensuring that the receiver of the other service transmission may use the pilot signals to perform the data demodulation, and avoiding the resource waste caused by the pilot signal destruction.

BRIEF DESCRIPTION OF THE DRAWINGS

The accompanying drawings illustrated here are used to provide the further understanding of the present application and constitute a part of the present application, and the schematic embodiments of the present application and the illustration thereof are used to explain the present application but not limit the present application improperly. In the accompanying drawings.

DETAILED DESCRIPTION OF THE EMBODIMENTS

With the development and change of mobile communication service requirements, many organizations such as International Telecommunication Union (ITU) have begun to study new wireless communication systems (i.e., 5 Generation New RAT (5G NR)) for the future mobile communication systems. There are different service transmissions in the 5G system, and different TTIs are used for transmission according to the index requirements of different service transmissions. In the 5G system, the services with the TTIs of different lengths are allowed to be transmitted simultaneously. However, when the resources of the TTIs of different lengths overlap and there is the pilot signal at the resource overlapping position, there is no clear solution on how to avoid the pilot signal from being affected.

Based on this, the embodiments of the present application provides a solution in which when the resources of the TTI transmissions of different lengths or different service priorities overlap and it is necessary to perform the puncturing operation on the resources of the shorter TTI or the TTI of lower service priority, the base station will retain the pilot signal if the pilot signal exists in the punctured resources. The base station notifies, through signaling, the terminal performing the TTI transmission of shorter length or higher service priority of whether there is a pilot signal of other different TTI transmission at the resource overlapping position, and the multiplexing mode of the pilot signal and the transmission data of the terminal. The specific embodiments of the present application will be illustrated below in combination with the drawings.

In the illustration process, the implementations will be illustrated from the base station side and the terminal side respectively, and then the instance of the downlink transmission implementation performed by both of them in cooperation is also given to better understand the implementations of the solution provided in the embodiments of the present application. Of course, it is easy to understand that the solution may also be used in the uplink transmission. Meanwhile, such illustration does not mean they must implement in cooperation or must implement alone. Actually, when the terminal and the base station implement separately, they also solve the problems at the terminal side and the base station side respectively, while the better technical effect may be obtained when they are used in combination.

Figure 1:
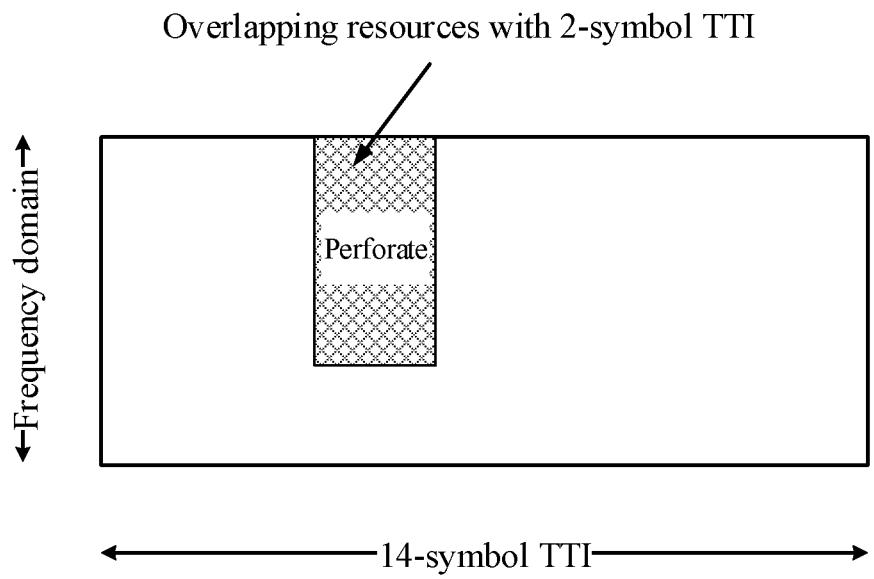
FIG. 1 is a resource schematic diagram where the resource overlapping part is punctured in the background art.
Figure 2:
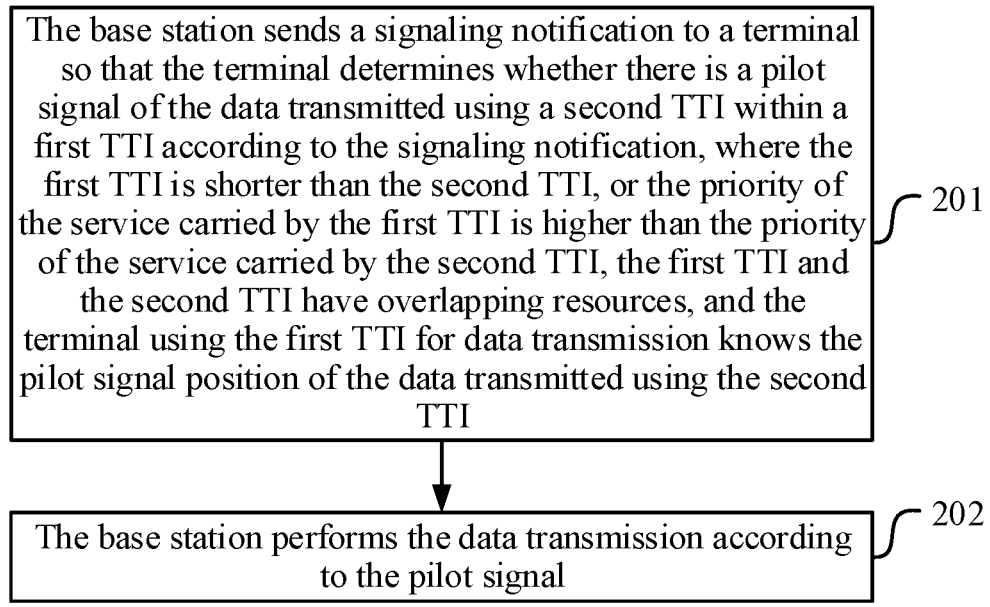
FIG. 2 is a schematic diagram of an implementation flow of a data transmission method of the base station side according to the embodiments of the present application.

FIG. 2 is a schematic diagram of an implementation flow of a data transmission method of the base station side. As shown in FIG. 2, the method may include:

Step 201: the base station sends a signaling notification to a terminal so that the terminal determines whether there is a pilot signal of the data transmitted using a second TTI within a first TTI according to the signaling notification, where the first TTI is shorter than the second TTI, or the priority of the service carried by the first TTI is higher than the priority of the service carried by the second TTI, the first TTI and the second TTI have overlapping resources, and the terminal using the first TTI for data transmission knows the pilot signal position of the data transmitted using the second TTI; and Step 202: the base station performs the data transmission according to the pilot signal.

Figure 3:
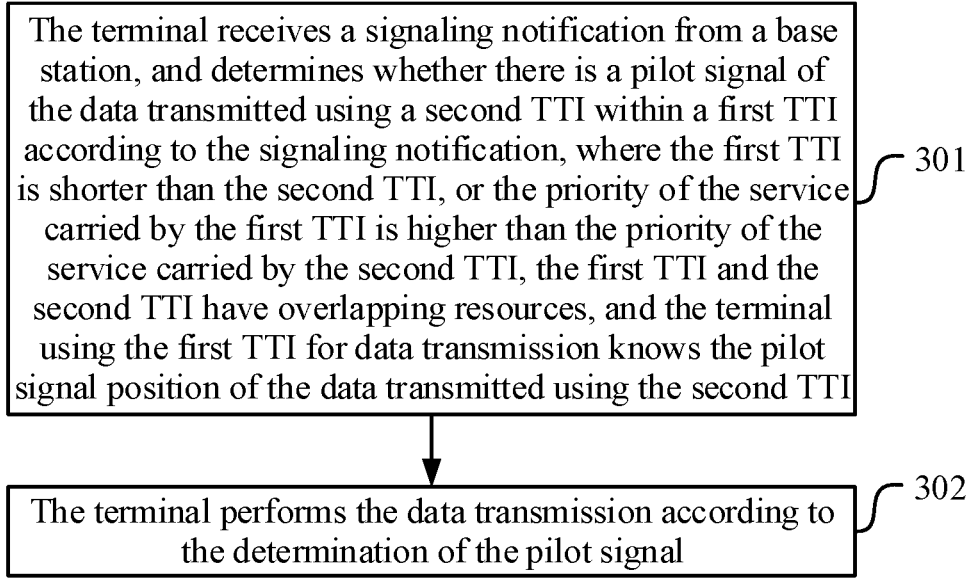
FIG. 3 is a schematic diagram of an implementation flow of a data transmission method of the terminal side according to the embodiments of the present application.

FIG. 3 is a schematic diagram of an implementation flow of a data transmission method of the terminal side. As shown in FIG. 3, the method may include:

Step 301: the terminal receives a signaling notification from a base station, and determines whether there is a pilot signal of the data transmitted using a second TTI within a first TTI according to the signaling notification, where the first TTI is shorter than the second TTI, or the priority of the service carried by the first TTI is higher than the priority of the service carried by the second TTI, the first TTI and the second TTI have overlapping resources, and the terminal using the first TTI for data transmission knows the pilot signal position of the data transmitted using the second TTI; and Step 302: the terminal performs the data transmission according to the determination of the pilot signal.

Specifically, the terminal receives the signaling notification from the base station, and determines whether there is the pilot signal of the data transmitted using the second TTI in the first TTI according to the signaling notification.

Where, the first TTI is shorter than the second TTI, or the priority of the service carried by the first TTI is higher than the priority of the service carried by the second TTI. The first TTI and the second TTI have overlapping resources.

The terminal of the first TTI knows the pilot signal position of the second TTI.

In a specific implementation, the base station sends the signaling notification to the terminal so that the terminal determines whether there is the pilot signal of the data transmitted using the second TTI in the first TTI according to the signaling notification, so the base station may perform the transmission according to the pilot signal resource position of the second TTI, so that the terminal can determine whether there are pilot signals transmitted by other services in the data transmission, thereby ensuring that the receiver of the other service transmission may use the pilot signals to perform the data demodulation, and avoiding the resource waste caused by the pilot signal destruction.

In a specific implementation, the embodiments of the present application provide three specific modes which will be illustrated below.

1. First Mode:

In this mode, after receiving the signaling notification, the terminal determines whether the data of the first TTI is punctured at the pilot signal position of the second TTI within the first TTI resource.

It is implemented at the base station side as follows:

The base station sends the signaling notification to the terminal, which includes:

the base station determines that the data resources of the first TTI are punctured and the punctured resources are provided to the pilot signal of the second TTI for transmission when the resource overlapping part has the pilot signal of the second TTI and there is no overlap between the pilot signal of the first TTI and the pilot signal of the second TTI; or the base station determines that the resources of the first TTI are not punctured when the resource overlapping part has the pilot signal of the second TTI and there is an overlap between the pilot signal of the first TTI and the pilot signal of the second TTI; and the base station sends the signaling notification of whether to puncture the data of the first TTI on the pilot signal position of the second TTI within the first TTI resources to the terminal.

Specifically, at the base station side, the base station determines that the data resources of the first TTI are punctured and the punctured resources are provided to the pilot signal of the second TTI for transmission when the resource overlapping part has the pilot signal of the second TTI and there is no overlap between the pilot signal of the first TTI and the pilot signal of the second TTI.

The base station determines that the resources of the first TTI are not punctured when the resource overlapping part has the pilot signal of the second TTI and there is an overlap between the pilot signal of the first TTI and the pilot signal of the second TTI.

The base station may use 1-bit information to notify the terminal of whether to puncture the data of the first TTI on the pilot signal position of the second TTI within the first TTI resources.

It is implemented at the terminal side as follows:

The terminal determines whether to puncture the data of the first TTI within the first TTI according to the signaling notification.

The terminal performs the data transmission according to the determination of the pilot signal, which includes:

the terminal performs the puncturing operation according to the pilot signal position of the data transmitted in the second TTI when sending the data, if it is determined that the first TTI resource is punctured; and perform the corresponding receiving process according to the punctured resource position when receiving the data.

Specifically, at the terminal side, the terminal may determine whether to puncture the data of the first TTI on the pilot signal position of the second TTI within the first TTI resource after receiving the 1-bit information notification from the base station.

If it is determined that the first TTI resource is punctured, the terminal performs the puncturing operation when sending the data; and performs the special reception process according to the position of the punctured resource when receiving the data, for example, may set the data on the punctured position as 0 when sending the data.

It will be illustrated below by way of examples as follows:

First Embodiment

Figure 4:
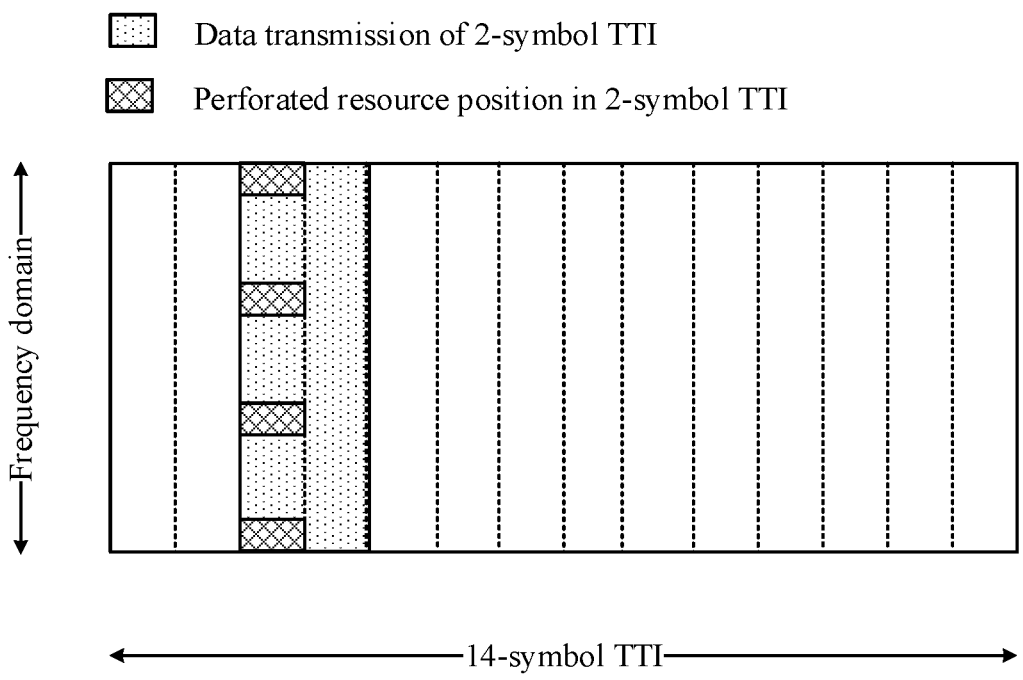
FIG. 4 is a schematic diagram where the resource position of the pilot signal is punctured and provided to the pilot signal for transmission according to a first embodiment of the present application.

FIG. 4 is a schematic diagram where the resource position of the pilot signal is punctured and provided to the pilot signal for transmission according to the first embodiment. It is assumed that the first TTI is the 2-symbol TTI and the second TTI is the 14-symbol TTI in the downlink transmission. As shown in FIG. 4, the resources on the $3^{rd}$ and $4^{th}$ symbols of the 14-symbol TTI transmission overlap with the transmission resources of the 2-symbol TTI, and the base station will puncture the resources on the $3^{rd}$ and $4^{th}$ symbols and provides them to the 2-symbol TTI for data transmission.

But the pilot signal of the 14-symbol TTI (the schematic part with the gridlines) exists in the resource overlapping position, then the base station will puncture the resources of the 2-symbol TTI in the data resources of the 2-symbol TTI, that is, the pilot signal position resource of the 14-symbol TTI (the schematic part with the gridlines) is taken into account when the rate matching is performed on the data of the 2-symbol TTI, but there is no mapping on this pilot signal position when the resource mapping is performed, and this part of resources which are not mapped are reserved for the pilot signals of 14-symbol TTI for transmission.

The base station notifies the terminal of the 2-symbol TTI by using 1-bit information, and the terminal determines that there is the pilot signal of 14-symbol TTI within the received 2-symbol TTI, where the resources of the pilot signal position thereof are punctured. When the data is received, the received data corresponding to the punctured position is set to 0.

2. Second Mode:

In this mode, after receiving the signaling notification, the terminal determines whether the resources corresponding to the pilot signal position of the second TTI need to be reserved during the resource mapping in the first TTI, that is, this part of resources are not used for the first TTI transmission, so this part of resources are not considered when the rate matching is performed on the data during the first TTI transmission.

It is implemented at the base station side as follows:

The base station sends the signaling notification to the terminal, which includes:

the base station performs the rate matching and resource mapping on the data of the first TTI in the resources except the pilot signal position when the resource overlapping part has the pilot signal of the second TTI and there is no overlap between the pilot signal of the first TTI and the pilot signal of the second TTI; or the base station performs the rate matching and resource mapping on the data according to the originally occupied resources of the first TTI when the resource overlapping part has the pilot signal of the second TTI and there is also an overlap between the pilot signal of the first TTI and the pilot signal of the second TTI.

When the base station performs the rate matching and resource mapping on the data of the first TTI in the resources except the pilot signal position, the method further includes:

the base station notifies the terminal of whether the resource mapping is performed on the data of the first TTI in the resources except the pilot signal position of the second TTI.

Specifically, at the base station side, the base station performs the rate matching and resource mapping on the data of the first TTI in the resources except the pilot signal position when the resource overlapping part has the pilot signal of the second TTI and there is no overlap between the pilot signal of the first TTI and the pilot signal of the second TTI. In addition, the base station may use 1-bit information to notify the terminal of whether the resource mapping is performed on the data of the first TTI in the resources except the pilot signal position of the second TTI.

The base station performs the rate matching and resource mapping on the data according to the originally occupied resources of the first TTI when the resource overlapping part has the pilot signal of the second TTI and there is also an overlap between the pilot signal of the first TTI and the pilot signal of the second TTI.

It is implemented at the terminal side as follows:

The terminal determines whether there is the second TTI pilot signal in the data resources of the first TTI according to the signaling notification.

The terminal performs the data transmission according to the determination of the pilot signal, which includes:

the terminal determines that the resource mapping is performed on the transmission data of the first TTI in the resources except the pilot signal position of the second TTI and this part of pilot signal position resource is not considered for rate matching during encoding or decoding, if there is the second TTI pilot signal in the data resources of the first TTI.

Specifically, at the terminal side, the terminal may determine whether there is the second TTI pilot signal in the data resources of the first TTI after receiving the 1-bit information notification from the base station.

If so, the terminal may determine that the resource mapping is performed on the transmission data of the first TTI in the resources except the pilot signal position of the second TTI, so this part of pilot signal position resource is not considered for rate matching during encoding or decoding.

It will be illustrated below by way of examples as follows:

Second Embodiment

Figure 5:
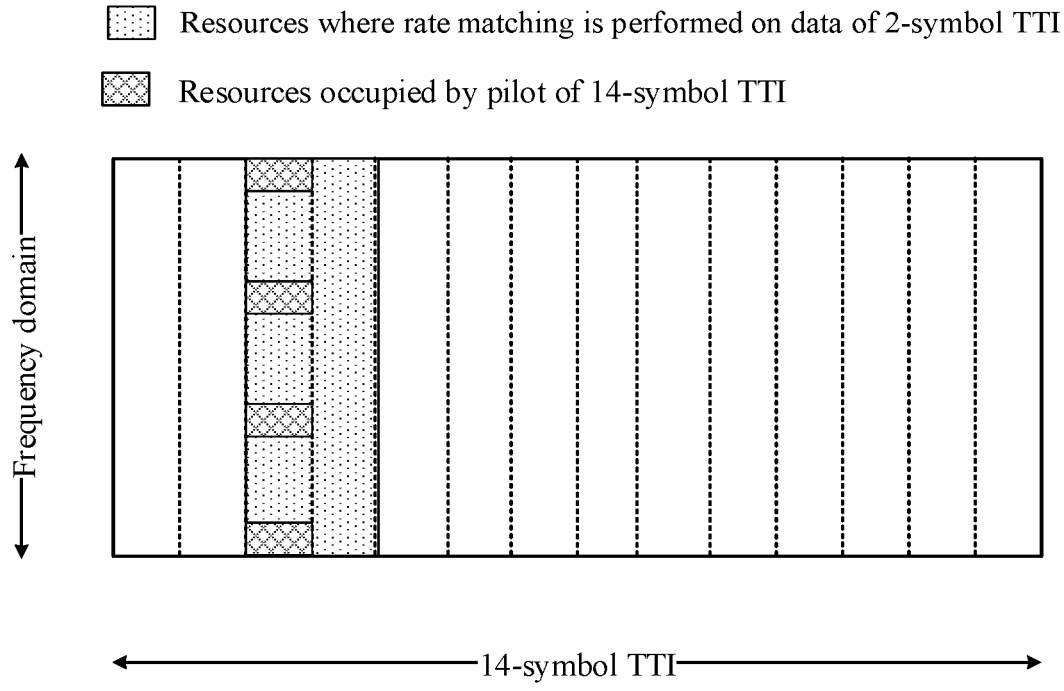
FIG. 5 is a schematic diagram of performing the rate matching on the resources except the pilot signal position according to a second embodiment of the present application.

FIG. 5 is a schematic diagram of performing the rate matching on the resources except the pilot signal position according to the second embodiment. It is assumed that the first TTI is the 2-symbol TTI and the second TTI is the 14-symbol TTI in the downlink transmission. As shown in FIG. 5, the resources on the $3^{rd}$ and $4^{th}$ symbols of the 14-symbol TTI transmission overlap with the transmission resources of the 2-symbol TTI, and the base station will puncture the resources on the $3^{rd}$ and $4^{th}$ symbols and provides them to the 2-symbol TTI for data transmission.

But the pilot signal of the 14-symbol TTI (the schematic part with the gridlines) exists in the resource overlapping position, then the base station will perform the rate matching and resource mapping on the data of the 2-symbol TTI in the resources except the pilot signal position.

The base station notifies the terminal of the 2-symbol TTI by using 1-bit information, and the terminal determines that there is the pilot signal of 14-symbol TTI within the received 2-symbol TTI after receiving the information, so the rate matching is performed on the transmission data thereof in the resources except the pilot signal position. When the de-rate matching is performed on the received data, the resources of the 14-symbol pilot signal position will be excluded.

3. Third Mode:

In this mode, after receiving the signaling notification, the terminal determines whether the data of the first TTI is punctured at the pilot signal position of the second TTI within the first TTI resource, or whether the resources corresponding to the pilot signal position of the second TTI need to be reserved during the resource mapping.

It is implemented at the base station side as follows:

The base station sends the signaling notification to the terminal, which includes:

the base station determines that the data resources of the first TTI are punctured and the punctured resources are provided to the pilot signal of the second TTI for transmission, or the base station determines that the rate matching is performed on the data of the first TTI in the resources except the pilot signal position when the resource overlapping part has the pilot signal of the second TTI and there is no overlap between the pilot signal of the first TTI and the pilot signal of the second TTI; or the base station determines that the resources of the first TTI are not punctured, and performs the rate matching and resource mapping on the data according to the originally occupied resources of the first TTI when the resource overlapping part has the pilot signal of the second TTI and there is an overlap between the pilot signal of the first TTI and the pilot signal of the second TTI.

The method may further include:

the base station notifies the terminal of whether the pilot signal exists and whether to perform the puncturing operation or rate matching operation; or the base station notifies the terminal of whether to perform the puncturing operation according to the pilot signal position of the second TTI or perform the rate matching operation according to the pilot signal position of the second TTI.

Specifically, at the base station side, the base station determines that the data resources of the first TTI are punctured and the punctured resources are provided to the pilot signal of the second TTI for transmission, or the base station determines that the rate matching is performed on the data of the first TTI in the resources except the pilot signal position when the resource overlapping part has the pilot signal of the second TTI and there is no overlap between the pilot signal of the first TTI and the pilot signal of the second TTI.

The base station determines that the resources of the first TTI are not punctured, and performs the rate matching and resource mapping on the data according to the originally occupied resources of the first TTI when the resource overlapping part has the pilot signal of the second TTI and there is an overlap between the pilot signal of the first TTI and the pilot signal of the second TTI.

The base station may use the 2-bit information to notify the terminal of whether the pilot signal exists and whether to perform the puncturing operation or rate matching operation.

The base station may also use the 1-bit information to notify the terminal of whether to perform the puncturing operation according to the pilot signal position of the second TTI or perform the rate matching operation according to the pilot signal position of the second TTI.

It is implemented at the terminal side as follows:

The terminal determines whether there is the second TTI pilot signal in the data resources of the first TTI according to the signaling notification, and determines whether to perform the puncturing operation or rate matching operation.

The terminal performs the data transmission according to the determination of the pilot signal, which includes:

the terminal performs the puncturing operation according to the resource position of the second pilot signal when sending the data, if there is the second pilot signal and the puncturing operation is performed; and performs the corresponding receiving process according to the punctured resource position when receiving the data; or the terminal determines that the resource mapping is performed on the transmission data of the first TTI in the resources except the pilot signal position of the second TTI and this part of pilot signal position resource is not considered for rate matching during encoding or decoding, if there is the second pilot signal and the rate matching operation is performed.

Or:

The terminal determines, according to the signaling notification, whether to perform the puncturing operation according to the pilot signal position of the second TTI or perform the rate matching operation according to the pilot signal position of the second TTI.

The terminal performs the data transmission according to the determination of the pilot signal, which includes:

the terminal performs the puncturing operation on the first TTI if there is the pilot signal position of the second TTI in the resources of the first TTI, if the puncturing operation is performed; or the terminal determines whether there is the pilot signal of the second TTI in the resources of the first TTI according to the pilot signal position of the second TTI if the rate matching operation is performed, and if so, determines that the resource mapping is performed on the transmission data of the first TTI in the resources except the pilot signal position of the second TTI and this part of pilot signal position resource is not considered for rate matching during encoding or decoding; if not, the terminal performs the rate matching and resource mapping in the original resources of the first TTI.

Specifically, at the terminal side, the terminal may determine whether there is the second TTI pilot signal in the data resources of the first TTI and determine whether to perform the puncturing operation or rate matching operation after receiving the 2-bit information notification from the base station.

If there is the second pilot signal and the puncturing operation is performed, the terminal performs the puncturing operation according to the resource position of the second pilot signal when sending the data; and performs the special reception process according to the position of the punctured resource when receiving the data, for example, may set the data on the punctured position as 0 when sending the data.

If there is the second pilot signal and the rate matching operation is performed, the terminal may determine that the resource mapping is performed on the transmission data of the first TTI in the resources except the pilot signal position of the second TTI, so this part of pilot signal position resource is not considered for rate matching during encoding or decoding.

Or, after receiving the 1-bit information notification from the base station, the terminal may determine whether to perform the puncturing operation according to the pilot signal position of the second TTI or perform the rate matching operation according to the pilot signal position of the second TTI.

If the puncturing operation is performed, the terminal performs the puncturing operation on the first TTI if there is the pilot signal position of the second TTI in the resources of the first TTI.

If the rate matching operation is performed, the terminal may determine whether there is the pilot signal of the second TTI in the resources of the first TTI according to the pilot signal position of the second TTI. If so, the terminal determines that the resource mapping is performed on the transmission data of the first TTI in the resources except the pilot signal position of the second TTI and this part of pilot signal position resource is not considered for rate matching during encoding or decoding; if not, the terminal performs the rate matching and resource mapping in the original resources of the first TTI.

It will be illustrated below by way of examples as follows:

Third Embodiment

Figure 6:
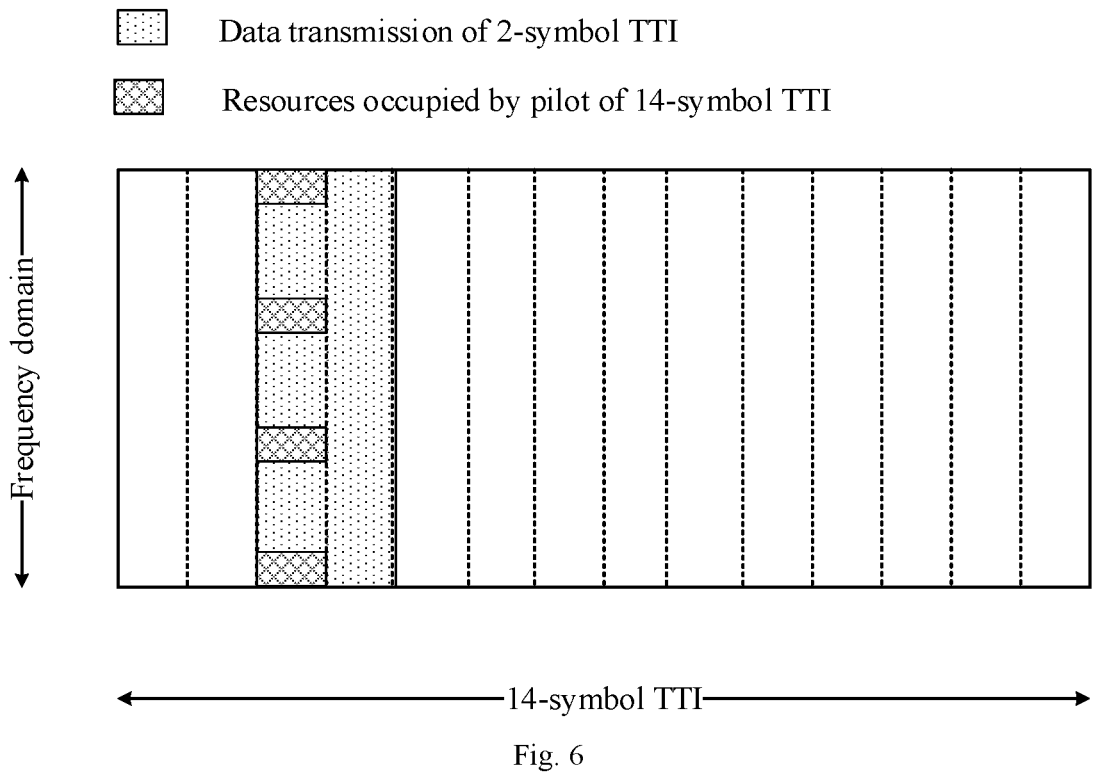
FIG. 6 is a schematic diagram where the base station indicates that there is the pilot signal of the 14-symbol TTI in the 2-symbol TTI by using 2 bits and performs the puncturing operation according to a third embodiment of the present application.

FIG. 6 is a schematic diagram where the base station indicates that there is the pilot signal of the 14-symbol TTI in the 2-symbol TTI by using 2 bits and performs the puncturing operation according to the third embodiment. It is assumed that the first TTI is the 2-symbol TTI and the second TTI is the 14-symbol TTI in the downlink transmission. As shown in FIG. 6, the resources on the $3^{rd}$ and $4^{th}$ symbols of the 14-symbol TTI transmission overlap with the transmission resources of the 2-symbol TTI, and the base station will puncture the resources on the $3^{rd}$ and $4^{th}$ symbols and provides them to the 2-symbol TTI for data transmission.

But the pilot signal of the 14-symbol TTI (the schematic part with the gridlines) exists in the resource overlapping position, then the base station will puncture the position of the schematic part with the gridlines in the data resources of the 2-symbol TTI, that is, the pilot signal position resource of the 14-symbol TTI (the schematic part with the gridlines) is taken into account when the rate matching is performed on the data of the 2-symbol TTI, but there is no mapping on this pilot signal position when the resource mapping is performed, and this part of resources which are not mapped are reserved for the pilot signals of 14-symbol TTI for transmission.

Or, the base station will perform the rate matching on the data of the 2-symbol TTI in the resources except the pilot signal position.

It is assumed that the base station notifies the terminal of the 2-symbol TTI by using the 2-bit information, and the base station notifies the terminal of the 2-symbol TTI that there is the pilot signal of the 14-symbol TTI and performs the puncturing operation on the data of the 2-symbol TTI.

After receiving the 2-bit information, the terminal of the 2-symbol TTI determines that there is the pilot signal of 14-symbol TTI within the received data resources, where the resources of the pilot signal position thereof are punctured. When the data is received, the received data corresponding to the punctured position is set to 0.

Based upon the same inventive concept, the embodiments of the present application further provide data transmission devices respectively used for the base station and the terminal. Since the principle solving the problem of these devices is similar to that of the data transmission methods, the implementations of these devices may refer to the implementations of the methods, and the repeated description thereof will be omitted here.

Figure 7:
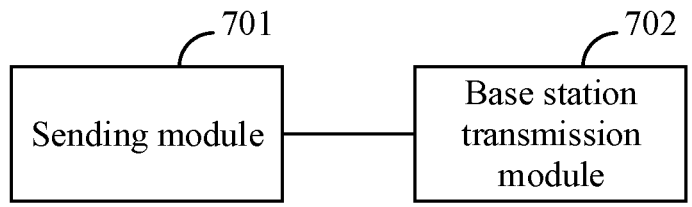
FIG. 7 is a structural schematic diagram of a data transmission device of the base station side according to the embodiments of the present application.

FIG. 7 is a structural schematic diagram of a data transmission device of the base station side. As shown in FIG. 7, the device may include:

a sending module 701 configured to send a signaling notification to a terminal so that the terminal determines whether there is a pilot signal of the data transmitted using a second TTI within a first TTI according to the signaling notification, where the first TTI is shorter than the second TTI, or the priority of the service carried by the first TTI is higher than the priority of the service carried by the second TTI, the first TTI and the second TTI have overlapping resources, and the terminal using the first TTI for data transmission knows the pilot signal position of the data transmitted using the second TTI; and a base station transmission module 702 configured to perform the data transmission according to the pilot signal.

In an implementation, when sending the signaling notification to the terminal, the sending module is further configured to:

determine that the data resources of the first TTI are punctured and the punctured resources are provided to the pilot signal of the second TTI for transmission when the resource overlapping part has the pilot signal of the second TTI and there is no overlap between the pilot signal of the first TTI and the pilot signal of the second TTI; or determine that the resources of the first TTI are not punctured when the resource overlapping part has the pilot signal of the second TTI and there is an overlap between the pilot signal of the first TTI and the pilot signal of the second TTI; and send the signaling notification of whether to puncture the data of the first TTI on the pilot signal position of the second TTI within the first TTI resources to the terminal.

In an implementation, when sending the signaling notification to the terminal, the sending module is further configured to:

perform the rate matching and resource mapping on the data of the first TTI in the resources except the pilot signal position when the resource overlapping part has the pilot signal of the second TTI and there is no overlap between the pilot signal of the first TTI and the pilot signal of the second TTI; or perform the rate matching and resource mapping on the data according to the originally occupied resources of the first TTI when the resource overlapping part has the pilot signal of the second TTI and there is an overlap between the pilot signal of the first TTI and the pilot signal of the second TTI.

In an implementation, the sending module is further configured to notify the terminal of whether the resource mapping is performed on the data of the first TTI in the resources except the pilot signal position of the second TTI when performing the rate matching and resource mapping on the data of the first TTI in the resources except the pilot signal position.

In an implementation, when sending the signaling notification to the terminal, the sending module is further configured to:

determine that the data resources of the first TTI are punctured and the punctured resources are provided to the pilot signal of the second TTI for transmission, or determine that the rate matching is performed on the data of the first TTI in the resources except the pilot signal position when the resource overlapping part has the pilot signal of the second TTI and there is no overlap between the pilot signal of the first TTI and the pilot signal of the second TTI; or determine that the resources of the first TTI are not punctured, and perform the rate matching and resource mapping on the data according to the originally occupied resources of the first TTI when the resource overlapping part has the pilot signal of the second TTI and there is also an overlap between the pilot signal of the first TTI and the pilot signal of the second TTI.

In an implementation, the sending module is further configured to: notify the terminal of whether the pilot signal exists and whether to perform the puncturing operation or rate matching operation; or notify the terminal of whether to perform the puncturing operation according to the pilot signal position of the second TTI or perform the rate matching operation according to the pilot signal position of the second TTI.

Figure 8:
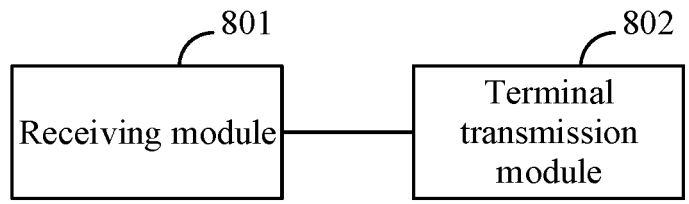
FIG. 8 is a structural schematic diagram of a data transmission device of the terminal side according to the embodiments of the present application.

FIG. 8 is a structural schematic diagram of a data transmission device of the terminal side. As shown, the device may include:

a receiving module 801 configured to receive a signaling notification from a base station, and determine whether there is a pilot signal of the data transmitted using a second TTI within a first TTI according to the signaling notification, where the first TTI is shorter than the second TTI, or the priority of the service carried by the first TTI is higher than the priority of the service carried by the second TTI, the first TTI and the second TTI have overlapping resources, and the terminal using the first TTI for data transmission knows the pilot signal position of the data transmitted using the second TTI; and a terminal transmission module 802 configured to perform the data transmission according to the determination of the pilot signal.

In an implementation, the terminal transmission module is further configured to determine whether to puncture the data of the first TTI within the first TTI according to the signaling notification.

In an implementation, when performing the data transmission according to the determination of the pilot signal, the terminal transmission module is further configured to:

perform the puncturing operation according to the pilot signal position of the data transmitted in the second TTI when sending the data, if it is determined that the first TTI resource is punctured; and perform the corresponding receiving process according to the punctured resource position when receiving the data.

In an implementation, the terminal transmission module is further configured to determine whether there is a second TTI pilot signal in the data resources of the first TTI according to the signaling notification.

In an implementation, when performing the data transmission according to the determination of the pilot signal, the terminal transmission module is further configured to:

determine that the resource mapping is performed on the transmission data of the first TTI in the resources except the pilot signal position of the second TTI and this part of pilot signal position resource is not considered for rate matching during encoding or decoding, if there is the second TTI pilot signal in the data resources of the first TTI.

In an implementation, the terminal transmission module is further configured to determine whether there is a second TTI pilot signal in the data resources of the first TTI according to the signaling notification, and determine whether to perform the puncturing operation or rate matching operation.

In an implementation, when performing the data transmission according to the determination of the pilot signal, the terminal transmission module is further configured to:

perform the puncturing operation according to the resource position of the second pilot signal when sending the data, if there is the second pilot signal and the puncturing operation is performed; and perform the corresponding receiving process according to the punctured resource position when receiving the data; or determine that the resource mapping is performed on the transmission data of the first TTI in the resources except the pilot signal position of the second TTI and this part of pilot signal position resource is not considered for rate matching during encoding or decoding, if there is the second pilot signal and the rate matching operation is performed.

In an implementation, the terminal transmission module is further configured to determine, according to the signaling notification, whether to perform the puncturing operation according to the pilot signal position of the second TTI or perform the rate matching operation according to the pilot signal position of the second TTI.

In an implementation, when performing the data transmission according to the determination of the pilot signal, the terminal transmission module is further configured to:

perform the puncturing operation on the first TTI if there is the pilot signal position of the second TTI in the resources of the first TTI, if the puncturing operation is performed; or determine whether there is the pilot signal of the second TTI in the resources of the first TTI according to the pilot signal position of the second TTI if the rate matching operation is performed, and if so, determine that the resource mapping is performed on the transmission data of the first TTI in the resources except the pilot signal position of the second TTI and this part of pilot signal position resource is not considered for rate matching during encoding or decoding; if not, perform the rate matching and resource mapping in the original resources of the first TTI.

For the sake of description, all the parts of the above-mentioned device are divided into various modules or units by function, which are described respectively. Of course, the functions of the various modules or units may be implemented in the same one or more softwares or hardwares when the present application is implemented.

When the technical solution provided by the embodiment of the present application is implemented, it may be implemented in such way as follows.

Figure 9:
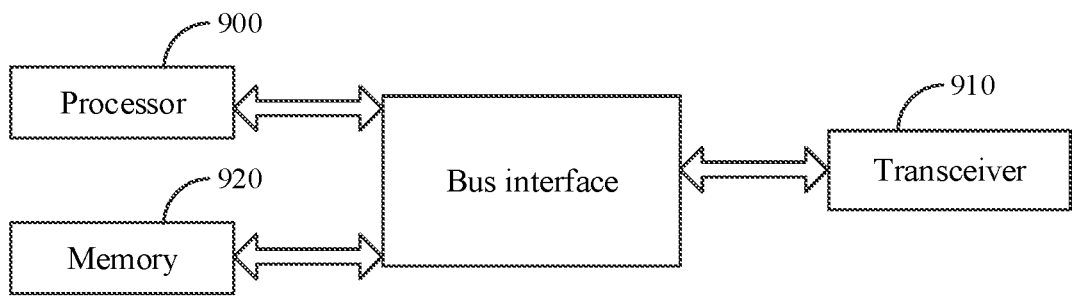
FIG. 9 is a structural schematic diagram of a base station according to the embodiments of the present application.

FIG. 9 is a structural schematic diagram of a base station, and as shown in FIG. 9, the base station includes:

a processor 900 configured to read the programs in a memory 920 to perform the process of:

processing the data according to the receiver's requirement;

a transceiver 910 configured to receive and send the data under the control of the processor 900 to perform the process of:

sending a signaling notification to a terminal so that the terminal determines whether there is a pilot signal of the data transmitted using a second TTI within a first TTI according to the signaling notification, where the first TTI is shorter than the second TTI, or the priority of the service carried by the first TTI is higher than the priority of the service carried by the second TTI, the first TTI and the second TTI have overlapping resources, and the terminal using the first TTI for data transmission knows the pilot signal position of the data transmitted using the second TTI; and performing the data transmission according to the pilot signal.

In an implementation, the base station sends the signaling notification to the terminal, which includes:

the base station determines that the data resources of the first TTI are punctured and the punctured resources are provided to the pilot signal of the second TTI for transmission when the resource overlapping part has the pilot signal of the second TTI and there is no overlap between the pilot signal of the first TTI and the pilot signal of the second TTI; or the base station determines that the resources of the first TTI are not punctured when the resource overlapping part has the pilot signal of the second TTI and there is an overlap between the pilot signal of the first TTI and the pilot signal of the second TTI; and the base station sends the signaling notification of whether to puncture the data of the first TTI on the pilot signal position of the second TTI within the first TTI resources to the terminal.

In an implementation, the base station sends the signaling notification to the terminal, which includes:

the base station performs the rate matching and resource mapping on the data of the first TTI in the resources except the pilot signal position when the resource overlapping part has the pilot signal of the second TTI and there is no overlap between the pilot signal of the first TTI and the pilot signal of the second TTI; or the base station performs the rate matching and resource mapping on the data according to the originally occupied resources of the first TTI when the resource overlapping part has the pilot signal of the second TTI and there is an overlap between the pilot signal of the first TTI and the pilot signal of the second TTI.

In an implementation, when the base station performs the rate matching and resource mapping on the data of the first TTI in the resources except the pilot signal position, the process further includes:

the base station notifies the terminal of whether the resource mapping is performed on the data of the first TTI in the resources except the pilot signal position of the second TTI.

In an implementation, the base station sends the signaling notification to the terminal, which includes:

the base station determines that the data resources of the first TTI are punctured and the punctured resources are provided to the pilot signal of the second TTI for transmission, or the base station determines that the rate matching is performed on the data of the first TTI in the resources except the pilot signal position when the resource overlapping part has the pilot signal of the second TTI and there is no overlap between the pilot signal of the first TTI and the pilot signal of the second TTI; or the base station determines that the resources of the first TTI are not punctured, and performs the rate matching and resource mapping on the data according to the originally occupied resources of the first TTI when the resource overlapping part has the pilot signal of the second TTI and there is an overlap between the pilot signal of the first TTI and the pilot signal of the second TTI.

In an implementation, the process further includes:

the base station notifies the terminal of whether the pilot signal exists and whether to perform the puncturing operation or rate matching operation; or the base station notifies the terminal of whether to perform the puncturing operation according to the pilot signal position of the second TTI or perform the rate matching operation according to the pilot signal position of the second TTI.

Where, in FIG. 9, the bus architecture may include any numbers of interconnected buses and bridges, and specifically link various circuits of one or more processors represented by the processor 900 and the memory represented by the memory 920. The bus architecture may further link various other circuits such as peripheral device, voltage regulator and power management circuit, which are all well known in the art and thus will not be further described again herein. The bus interface provides an interface. The transceiver 910 may be a plurality of elements, i.e., include a transmitter and a receiver, and provide the units for communicating with various other devices over the transmission media. The processor 900 is responsible for managing the bus architecture and general processing, and the memory 920 may store the data used by the processor 900 when performing the operations.

Figure 10:
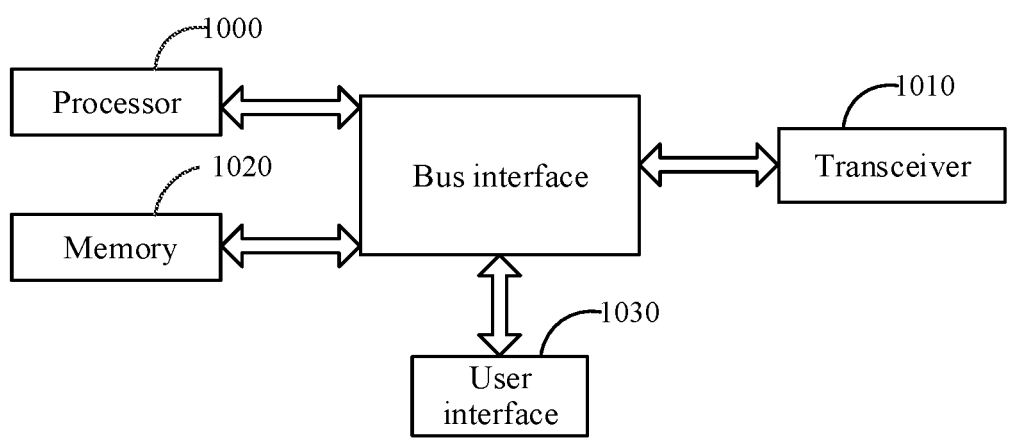
FIG. 10 is a structural schematic diagram of a terminal according to the embodiments of the present application.

FIG. 10 is a structural schematic diagram of a terminal, and as shown in FIG. 10, the terminal includes:

a processor 1000 configured to read the programs in a memory 1020 to perform the process of:

processing the data according to the transceiver's requirement;

a transceiver 1010 configured to receive and send the data under the control of the processor 1000 to perform the process of:

receiving a signaling notification from a base station, and determining whether there is a pilot signal of the data transmitted using a second TTI within a first TTI according to the signaling notification, where the first TTI is shorter than the second TTI, or the priority of the service carried by the first TTI is higher than the priority of the service carried by the second TTI, the first TTI and the second TTI have overlapping resources, and the terminal using the first TTI for data transmission knows the pilot signal position of the data transmitted using the second TTI; and performing the data transmission according to the determination of the pilot signal.

In an implementation, the terminal determines whether to puncture the data of the first TTI within the first TTI according to the signaling notification.

In an implementation, the terminal performs the data transmission according to the determination of the pilot signal, which includes:

the terminal performs the puncturing operation according to the pilot signal position of the data transmitted in the second TTI when sending the data, if it is determined that the first TTI resource is punctured; and perform the corresponding receiving process according to the punctured resource position when receiving the data.

In an implementation, the terminal determines whether there is a second TTI pilot signal in the data resources of the first TTI according to the signaling notification.

In an implementation, the terminal performs the data transmission according to the determination of the pilot signal, which includes:

the terminal determines that the resource mapping is performed on the transmission data of the first TTI in the resources except the pilot signal position of the second TTI and this part of pilot signal position resource is not considered for rate matching during encoding or decoding, if there is the second TTI pilot signal in the data resources of the first TTI.

In an implementation, the terminal determines whether there is a second TTI pilot signal in data resources of the first TTI according to the signaling notification, and determines whether to perform the puncturing operation or rate matching operation.

In an implementation, the terminal performs the data transmission according to the determination of the pilot signal, which includes:

the terminal performs the puncturing operation according to the resource position of the second pilot signal when sending the data, if there is the second pilot signal and the puncturing operation is performed; and performs the corresponding receiving process according to the punctured resource position when receiving the data; or the terminal determines that the resource mapping is performed on the transmission data of the first TTI in the resources except the pilot signal position of the second TTI and this part of pilot signal position resource is not considered for rate matching during encoding or decoding, if there is the second pilot signal and the rate matching operation is performed.

In an implementation, the terminal determines, according to the signaling notification, whether to perform the puncturing operation according to the pilot signal position of the second TTI or perform the rate matching operation according to the pilot signal position of the second TTI.

In an implementation, the terminal performs the data transmission according to the determination of the pilot signal, which includes:

the terminal performs the puncturing operation on the first TTI if there is the pilot signal position of the second TTI in the resources of the first TTI, if the puncturing operation is performed; or the terminal determines whether there is the pilot signal of the second TTI in the resources of the first TTI according to the pilot signal position of the second TTI if the rate matching operation is performed, and if so, determines that the resource mapping is performed on the transmission data of the first TTI in the resources except the pilot signal position of the second TTI and this part of pilot signal position resource is not considered for rate matching during encoding or decoding; if not, the terminal performs the rate matching and resource mapping in the original resources of the first TTI.

Here, in FIG. 10, the bus architecture may include any numbers of interconnected buses and bridges, and specifically link various circuits of one or more processors represented by the processor 1000 and the memory represented by the memory 1020. The bus architecture may further link various other circuits such as peripheral device, voltage regulator and power management circuit, which are all well known in the art and thus will not be further described again herein. The bus interface provides an interface. The transceiver 1010 may be a plurality of elements, i.e., include a transmitter and a receiver, and provide the units for communicating with various other devices over the transmission media. For different user equipments, the user interface 1030 may also be the interface capable of inter-connecting or exter-connecting with the required devices, and the connected devices include but not limited to keypad, display, loudspeaker, microphone, joystick and the like.

The processor 1000 is responsible for managing the bus architecture and general processing, and the memory 1020 may store the data used by the processor 1000 when performing the operations.

To sum up, in the technical solution provided by the embodiments of the present application, for the case where the resources of two different service transmissions overlap, the base station sends the signaling notification to the terminal so that the terminal determines whether there is the pilot signal of the data transmitted using the second TTI in the first TTI according to the signaling notification, so the terminal can determine whether there are pilot signals transmitted by other services in the data transmission, thereby ensuring that the receiver of the other service transmission may use the pilot signals to perform the data demodulation, and avoiding the resource waste caused by the pilot signal destruction.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the embodiments of the present application have been described, those skilled in the art can make additional alterations and modifications to these embodiments once they learn about the basic creative concepts. Thus the attached claims are intended to be interpreted to include the embodiments as well as all the alterations and modifications falling within the scope of the present application.

Evidently those skilled in the art can make various modifications and variations to the embodiments of the present application without departing from the spirit and scope of the embodiments of the present application. Thus the present application is also intended to encompass these modifications and variations therein as long as these modifications and variations to the embodiments of the present application come into the scope of the claims of the present application and their equivalents.

What is claimed is:

1. A data transmission method, comprising:
receiving, by a terminal, a signaling notification from a base station, and determining whether there is a pilot signal of data transmitted using a second Transmission Time Interval, TTI, within a first TTI according to the signaling notification, wherein the first TTI is shorter than the second TTI, or priority of service carried by the first TTI is higher than priority of service carried by the second TTI, the first TTI and the second TTI have overlapping resources, and the terminal using the first TTI for data transmission knows a pilot signal position of the data transmitted using the second TTI; and
performing, by the terminal, data transmission according to the determination of the pilot signal.

2. The method of claim 1, wherein the terminal determines whether to puncture data of the first TTI within the first TTI according to the signaling notification;
wherein performing, by the terminal, data transmission according to the determination of the pilot signal, comprises:
performing, by the terminal, a puncturing operation according to a pilot signal position of data transmitted in the second TTI when sending the data, if it is determined that the first TTI resource is punctured; and
performing the corresponding receiving process according to a punctured resource position when receiving the data.

3. The method of claim 1, wherein the terminal determines whether there is a second TTI pilot signal in data resources of the first TTI according to the signaling notification;
wherein performing, by the terminal, data transmission according to the determination of the pilot signal, comprises:
determining, by the terminal, that resource mapping is performed on transmission data of the first TTI in resources except the pilot signal position of the second TTI and this part of pilot signal position resource is not considered for rate matching during encoding or decoding, if there is the second TTI pilot signal in the data resources of the first TTI.

4. The method of claim 1, wherein the terminal determines whether there is a second TTI pilot signal in data resources of the first TTI according to the signaling notification, and determines whether to perform a puncturing operation or rate matching operation;
wherein performing, by the terminal, data transmission according to the determination of the pilot signal, comprises:
performing, by the terminal, the puncturing operation according to a resource position of the second pilot signal when sending the data, if there is the second pilot signal and the puncturing operation is performed; and
performing the corresponding receiving process according to the punctured resource position when receiving the data; or
determining, by the terminal, that resource mapping is performed on transmission data of the first TTI in resources except the pilot signal position of the second TTI and this part of pilot signal position resource is not considered for rate matching during encoding or decoding, if there is the second pilot signal and the rate matching operation is performed.

5. The method of claim 1, wherein the terminal determines, according to the signaling notification, whether to perform a puncturing operation according to the pilot signal position of the second TTI or perform a rate matching operation according to the pilot signal position of the second TTI;
wherein performing, by the terminal, data transmission according to the determination of the pilot signal, comprises:
performing, by the terminal, the puncturing operation on the first TTI if there is the pilot signal position of the second TTI in resources of the first TTI, if the puncturing operation is performed; or determining, by the terminal, whether there is a pilot signal of the second TTI in the resources of the first TTI according to the pilot signal position of the second TTI if the rate matching operation is performed, and if so, determining that resource mapping is performed on transmission data of the first TTI in resources except the pilot signal position of the second TTI and this part of pilot signal position resource is not considered for rate matching during encoding or decoding; if not, performing, by the terminal, rate matching and resource mapping in original resources of the first TTI.

6. A data transmission device, comprising:
a memory configured to store program instructions; and
a processor configured to invoke the program instructions stored in the memory and perform the method of claim 1 in accordance with the obtained program.

7. A computer storage medium, wherein the computer storage medium stores computer executable instructions which are configured to cause the computer to perform the method of claim 1.

8. A data transmission method, comprising:
sending, by a base station, a signaling notification to a terminal so that the terminal determines whether there is a pilot signal of data transmitted using a second Transmission Time Interval, TTI, within a first TTI according to the signaling notification, wherein the first TTI is shorter than the second TTI, or priority of service carried by the first TTI is higher than priority of service carried by the second TTI, the first TTI and the second TTI have overlapping resources, and the terminal using the first TTI for data transmission knows a pilot signal position of the data transmitted using the second TTI; and
performing, by the base station, data transmission according to the pilot signal.

9. The method of claim 8, wherein the sending, by the base station, the signaling notification to the terminal, comprises:
determining, by the base station, that data resources of the first TTI are punctured and the punctured resources are provided to the pilot signal of the second TTI for transmission when a resource overlapping part has the pilot signal of the second TTI and there is no overlap between the pilot signal of the first TTI and the pilot signal of the second TTI; or
determining, by the base station, that resources of the first TTI are not punctured when a resource overlapping part has the pilot signal of the second TTI and there is an overlap between the pilot signal of the first TTI and the pilot signal of the second TTI; and
sending, by the base station, the signaling notification of whether to puncture the data of the first TTI on the pilot signal position of the second TTI within the first TTI resources to the terminal.

10. The method of claim 8, wherein the sending, by the base station, the signaling notification to the terminal, comprises:
performing, by the base station, rate matching and resource mapping on the data of the first TTI in resources except the pilot signal position when a resource overlapping part has the pilot signal of the second TTI and there is no overlap between the pilot signal of the first TTI and the pilot signal of the second TTI; or
performing, by the base station, rate matching and resource mapping on the data according to originally occupied resources of the first TTI when a resource overlapping part has the pilot signal of the second TTI and there is an overlap between the pilot signal of the first TTI and the pilot signal of the second TTI;
wherein when the base station performs the rate matching and resource mapping on the data of the first TTI in resources except the pilot signal position, the method further comprises:
notifying, by the base station, the terminal of whether the resource mapping is performed on the data of the first TTI in resources except the pilot signal position of the second TTI.

11. The method of claim 8, wherein the sending, by the base station, the signaling notification to the terminal, comprises:
determining, by the base station, that data resources of the first TTI are punctured and the punctured resources are provided to the pilot signal of the second TTI for transmission, or determining, by the base station, that rate matching is performed on the data of the first TTI in resources except the pilot signal position when a resource overlapping part has the pilot signal of the second TTI and there is no overlap between the pilot signal of the first TTI and the pilot signal of the second TTI; or
determining, by the base station, that resources of the first TTI are not punctured, and performing rate matching and resource mapping on the data according to originally occupied resources of the first TTI when a resource overlapping part has the pilot signal of the second TTI and there is an overlap between the pilot signal of the first TTI and the pilot signal of the second TTI;
wherein the method further comprises:
notifying, by the base station, the terminal of whether the pilot signal exists and whether to perform a puncturing operation or rate matching operation; or
notifying, by the base station, the terminal of whether to perform the puncturing operation according to the pilot signal position of the second TTI or perform the rate matching operation according to the pilot signal position of the second TTI.

12. A data transmission device, comprising:
a processor and a memory, wherein the memory has instructions stored thereon, which when executed by the processor, cause the processor to:
receive a signaling notification from a base station, and determine whether there is a pilot signal of data transmitted using a second Transmission Time Interval, TTI, within a first TTI according to the signaling notification, wherein the first TTI is shorter than the second TTI, or priority of service carried by the first TTI is higher than priority of service carried by the second TTI, the first TTI and the second TTI have overlapping resources, and a terminal using the first TTI for data transmission knows a pilot signal position of the data transmitted using the second TTI; and
perform data transmission according to the determination of the pilot signal.

13. The device of claim 12, wherein the instructions further cause the processor to determine whether to puncture data of the first TTI within the first TTI according to the signaling notification;
wherein when performing the data transmission according to the determination of the pilot signal, wherein the instructions further cause the processor to:

perform a puncturing operation according to a pilot signal position of data transmitted in the second TTI when sending the data, if it is determined that the first TTI resource is punctured; and
perform the corresponding receiving process according to a punctured resource position when receiving the data.

14. The device of claim 12, wherein the instructions further cause the processor to determine whether there is a second TTI pilot signal in data resources of the first TTI according to the signaling notification;
wherein when performing the data transmission according to the determination of the pilot signal, wherein the instructions further cause the processor to:
determine that resource mapping is performed on transmission data of the first TTI in resources except the pilot signal position of the second TTI and this part of pilot signal position resource is not considered for rate matching during encoding or decoding, if there is the second TTI pilot signal in the data resources of the first TTI.

15. The device of claim 12, wherein the instructions further cause the processor to determine whether there is a second TTI pilot signal in data resources of the first TTI according to the signaling notification, and determine whether to perform a puncturing operation or rate matching operation;
wherein when performing the data transmission according to the determination of the pilot signal, wherein the instructions further cause the processor to:
perform the puncturing operation according to a resource position of the second pilot signal when sending the data, if there is the second pilot signal and the puncturing operation is performed; and perform the corresponding receiving process according to the punctured resource position when receiving the data; or
determine that resource mapping is performed on transmission data of the first TTI in resources except the pilot signal position of the second TTI and this part of pilot signal position resource is not considered for rate matching during encoding or decoding, if there is the second pilot signal and the rate matching operation is performed.

16. The device of claim 12, wherein the instructions further cause the processor to determine, according to the signaling notification, whether to perform a puncturing operation according to the pilot signal position of the second TTI or perform a rate matching operation according to the pilot signal position of the second TTI;
wherein when performing the data transmission according to the determination of the pilot signal, wherein the instructions further cause the processor to:
perform the puncturing operation on the first TTI if there is the pilot signal position of the second TTI in resources of the first TTI, if the puncturing operation is performed; or
determine whether there is a pilot signal of the second TTI in the resources of the first TTI according to the pilot signal position of the second TTI if the rate matching operation is performed, and if so, determine that resource mapping is performed on transmission data of the first TTI in resources except the pilot signal position of the second TTI and this part of pilot signal position resource is not considered for rate matching during encoding or decoding; if not, perform rate matching and resource mapping in original resources of the first TTI.

17. A data transmission device, comprising:
a processor and a memory, wherein the memory has instructions stored thereon, which when executed by the processor, cause the processor to:
send a signaling notification to a terminal so that the terminal determines whether there is a pilot signal of data transmitted using a second Transmission Time Interval, TTI, within a first TTI according to the signaling notification, wherein the first TTI is shorter than the second TTI, or priority of service carried by the first TTI is higher than priority of service carried by the second TTI, the first TTI and the second TTI have overlapping resources, and the terminal using the first TTI for data transmission knows a pilot signal position of the data transmitted using the second TTI; and
perform data transmission according to the pilot signal.

18. The device of claim 17, wherein when sending the signaling notification to the terminal, the instructions further cause the processor to:
determine that data resources of the first TTI are punctured and the punctured resources are provided to the pilot signal of the second TTI for transmission when a resource overlapping part has the pilot signal of the second TTI and there is no overlap between the pilot signal of the first TTI and the pilot signal of the second TTI; or
determine that resources of the first TTI are not punctured when a resource overlapping part has the pilot signal of the second TTI and there is an overlap between the pilot signal of the first TTI and the pilot signal of the second TTI; and
send the signaling notification of whether to puncture the data of the first TTI on the pilot signal position of the second TTI within the first TTI resources to the terminal.

19. The device of claim 17, wherein when sending the signaling notification to the terminal, the instructions further cause the processor to:
perform rate matching and resource mapping on the data of the first TTI in resources except the pilot signal position when a resource overlapping part has the pilot signal of the second TTI and there is no overlap between the pilot signal of the first TTI and the pilot signal of the second TTI; or
perform rate matching and resource mapping on the data according to originally occupied resources of the first TTI when a resource overlapping part has the pilot signal of the second TTI and there is an overlap between the pilot signal of the first TTI and the pilot signal of the second TTI;
wherein the instructions further cause the processor to:
notify the terminal of whether the resource mapping is performed on the data of the first TTI in resources except the pilot signal position of the second TTI when performing the rate matching and resource mapping on the data of the first TTI in resources except the pilot signal position.

20. The device of claim 17, wherein when sending the signaling notification to the terminal, the instructions further cause the processor to:
determine that data resources of the first TTI are punctured and the punctured resources are provided to the pilot signal of the second TTI for transmission, or determine that rate matching is performed on the data of the first TTI in resources except the pilot signal position when a resource overlapping part has the pilot signal of the second TTI and there is no overlap between the pilot signal of the first TTI and the pilot signal of the second TTI; or determine that resources of the first TTI are not punctured and perform rate matching and resource mapping on the data according to originally occupied resources of the first TTI when a resource overlapping part has the pilot signal of the second TTI and there is an overlap between the pilot signal of the first TTI and the pilot signal of the second TTI;

wherein the instructions further cause the processor to:

notify the terminal of whether the pilot signal exists and whether to perform a puncturing operation or rate matching operation; or notify the terminal of whether to perform the puncturing operation according to the pilot signal position of the second TTI or perform the rate matching operation according to the pilot signal position of the second TTI.

* * * * *